United States Patent
Lovell (10) Patent No.: US 10,962,122 B2
(45) Date of Patent: Mar. 30, 2021

(54) ROTARY AXIAL GLOBE VALVE

(71) Applicant: FISHER CONTROLS INTERNATIONAL LLC, Marshalltown, IA (US)

(72) Inventor: Michel K. Lovell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 6 days.

(21) Appl. No.: 16/028,233

(22) Filed: Jul. 5, 2018

(65) Prior Publication Data

US 2020/0011431 A1    Jan. 9, 2020

(51) Int. Cl.
*F16K 3/26* (2006.01)
*F16K 5/12* (2006.01)
*F16K 31/52* (2006.01)

(52) U.S. Cl.
CPC .................. *F16K 3/26* (2013.01); *F16K 5/12* (2013.01); *F16K 31/523* (2013.01); *Y10T 137/87917* (2015.04); *Y10T 137/88038* (2015.04)

(58) Field of Classification Search
CPC . F16K 31/523; F16K 3/26; F16K 5/12; B08B 9/00; B08B 13/00; Y10T 137/87917; Y10T 137/88038
See application file for complete search history.

(56) References Cited

U.S. PATENT DOCUMENTS

| 1,143,999 | A | * | 6/1915 | Rosencrans | F16K 3/26 137/625.38 |
|---|---|---|---|---|---|
| 2,041,002 | A | * | 5/1936 | Kreuzer et al. | F16K 3/26 137/625.48 |
| 3,402,739 | A | | 9/1968 | Kass | |
| 3,423,064 | A | * | 1/1969 | Harland et al. | F16K 3/26 251/231 |
| 3,904,171 | A | | 9/1975 | Chronister et al. | |
| 2008/0128034 | A1 | * | 6/2008 | Fahl | F16L 37/18 137/614.06 |
| 2008/0224075 | A1 | | 9/2008 | Emin | |

FOREIGN PATENT DOCUMENTS

| FR | 1396503 A | 4/1965 |
|---|---|---|
| GB | 465494 A | 5/1937 |
| GB | 694155 A | 7/1953 |
| WO | WO-2015/093395 A1 | 6/2015 |

OTHER PUBLICATIONS

International Search Report and Written Opinion for PCT/US2019/040050, dated Dec. 11, 2019.

* cited by examiner

*Primary Examiner* — Kevin L Lee
(74) *Attorney, Agent, or Firm* — Marshall, Gerstein & Borun LLP (57) ABSTRACT

An example control valve is disclosed herein and includes a valve body having a substantially axial fluid flow path extending from an upstream face surface to a downstream face surface of the valve body. A crank is disposed within the valve body, and a reciprocating valve trim, external to the valve body, is coupled to the crank and abuts the downstream face surface of the valve body.

33 Claims, 7 Drawing Sheets

ROTARY AXIAL GLOBE VALVE

FIELD OF DISCLOSURE

The present disclosure generally relates to a rotary axial globe valve assembly, and, more particularly, to an integrated isolation-control valve assembly.

BACKGROUND

Control valves are commonly employed in process control systems to control fluid flow in the system downstream of the control valve. The flow at which a control system supplies fluid may vary according to the demands placed on the system. In liquid or gas control valves (collectively "fluid control valves"), a number of design and performance considerations may be important. For example, designers of fluid control valves may strive to design control valves that have greater pressure stability and reduced sensitivity to inlet pressure variations. Further, designers may strive to construct more compact designs, and designs which might favor easy assembly and service.

Conventional butterfly control valves operate by positioning a disk within a valve body to control fluid flow through the valve body. The disk rotates about a pivot point or axis defined by a shaft mounted within the valve body. Rotation of the disk, resulting from a torque applied to the shaft, creates or reduces an opening for fluid to flow through the valve body. As the disk is rotated from a closed position (typically vertical) to a fully open position (typically almost horizontal), the flow area through which the fluid can flow increases. The fluid flow can be somewhat controlled by adjusting the angle of rotation of the disk within the valve body. Conventional butterfly valves are generally the most economical of the all types of process control valves having small face-to-face dimensions and low actuator stack height. Compared with other types of control valves, for example globe valves and ball valves, butterfly valves provide a relatively high flow capacity for relatively lower cost. Thus, for specific applications, butterfly valves are very economical. In the alternative, conventional butterfly valves have limited application in process control due to the inherent flow attributes of these valves.

Globe or sliding stem control valves use an up and down movement of a plug connected to a stem within the valve body that closes against the flow passing through a valve seat. Globe valves are good for regulating flow. One of the main limitations of globe valves is that the shut-off rating can be lower than other valves, especially in the larger sizes. Also, globe valves generally are the largest control valves with larger face-to-face dimensions than rotary valves and generally have large actuator stack heights due to the increased thrust required to tightly shut off.

Alternatively, ball valves are designed with a ball inside the valve body that rotates against a seal and are for on/off control without pressure drop. In a full port ball valve, the ball has a hole through the middle so that when the hole is in line with both ends of the valve, flow will occur. When the valve is closed by turning the ball 90 degrees, the hole is perpendicular to the ends of the valve, and therefore flow is blocked. Ball valves are very durable and usually have excellent shutoff even after years of use. They are generally preferred over globe valves in shutoff applications. The main restriction in the application of ball valves is limited rangeability because of the large amount of flow that the ball allows.

Axial or in-line flow control valves are an alternative to control valves having a 90-degree turn. Axial flow valves have a flow path or passageway through the valve that is substantially straight or parallel to the fluid flow direction to minimize turbulent flow through the valve body. While the flow path or passageway may not be exactly straight or parallel, the flow path or passageway may include a turn that is significantly less than 90 degrees, which can reduce vibrations and losses of efficiency.

Axial flow control valves typically include an actuator mounted to an exterior surface of a valve body. The actuator is operatively coupled to a flow control member of the valve and moves the flow control member between an open position and a closed position to allow or prevent the flow of fluid through the valve. Some known axial flow control valves actuate a flow control member within the valve body relative to a seat ring to control fluid flow through the valve body. However, axial flow control valves suffer from complex internal actuation mechanisms and expensive maintenance costs.

Lastly, an isolation valve is a valve that stops the flow to a given location, usually for maintenance or safety purposes. Similar to the performance of a rotary butterfly valve in On-Off applications, they can also be used to provide flow logic (selecting one flow path versus another), and to connect external equipment to a system and are generally manually operated and can be either rotary or sliding stem configurations. That is, a valve is classified as an isolation valve because of its intended function in a process pipe loop, not because of the design of the valve itself and isolation valves are conventionally independent from control valves in process control loops. Many control valve applications will require two or three isolation valves for each control valve for maintenance or safety purposes.

As understood by one of ordinary skill in the art, the butterfly valves are better suited for low cost, On-Off flow control applications. Globes valves are suited for applications that are less cost sensitive and require high performance flow modulation whereas ball valves are most often used in high flow, tight suit off applications. However, numerous process control applications require precise flow control through the entire operational range of the control valve and tight shutoff.

SUMMARY

In accordance with a first exemplary aspect, a control valve includes a valve body having a substantially axial fluid flow path therethrough, and an upstream face surface and a downstream face surface. The control valve includes an axially slidable valve trim disposed external to the valve body within a downstream conduit, and a crank disposed within the valve body, with the crank extending outside the valve body to operably couple to the axially slidable valve trim in the downstream conduit.

In accordance with a second exemplary aspect, a fluid valve control element includes a rotary closure member defining or rotatable about a rotational axis and being operable between an open first position and a second closed position, an axially slidable fluid control member defining a longitudinal axis and providing flow characterization of the fluid valve, and a crank operably connecting or coupling the rotary closure member and the axially slidable fluid control member, wherein rotation of the rotary closure member about the rotational axis between the open position and the closed position motivates the axially slidable fluid control member to travel along the longitudinal axis.

In accordance with a third exemplary aspect, a valve assembly includes an isolation valve assembly, the isolation valve assembly consisting essentially of a valve body having a substantially axial fluid flow path therethrough and a rotary closure member disposed within the valve body, and a control valve assembly. The control valve assembly includes an axially slidable valve trim disposed within an adjacent or immediately adjacent downstream conduit external to the valve body and being operably connected to the isolation valve assembly.

In accordance with a fourth exemplary aspect, a valve includes a valve body having a substantially cylindrical fluid flow path therethrough and having an upstream face surface and a downstream face surface, and an isolation rotary closure member disposed within the valve body and being operable between a first opened position and a second closed position. An axially slidable valve trim is disposed external to the valve body within a downstream conduit and is operably connected to the isolation rotary closure member to control fluid flow through the axial fluid flow path.

In further accordance with any one or more of the foregoing first, second, third or fourth aspects, a slam-shut safety device and/or method may further include any one or more of the following preferred forms.

In one preferred form, the crank comprises a valve control arm disposed within the fluid flow path of the valve body and being rotatable about a pivot shaft, and including a valve lever having a first end and a second end, wherein the first end is operatively coupled to the valve control arm and the second end is operatively coupled to the axially slidable valve trim.

In another preferred form, the axially slidable valve trim comprises a cage and plug, with the cage abutting the downstream face surface, and with the cage including a sidewall defining a cage bore having a cage bore axis. The cage being arranged such that fluid flowing through the valve body exits through fluid passageways in the sidewall.

In another preferred form, the cage includes a valve seat.

In another preferred form, the downstream conduit is a spool piece or a downstream pipe.

In another preferred form, an outlet of the valve body defines a first bore and an outlet of the downstream conduit defines a second bore such that the downstream conduit adapts the first bore to the second bore.

In another preferred form, a diameter of the first bore is less than a diameter of the second bore.

In another preferred form, the cage includes plurality of apertures arranged to provide a selection of inherent flow characteristics selected from a group consisting of: a linear characteristic, a quick opening characteristic and an equal percentage characteristic.

In another preferred form, at least one of a valve control arm length, a valve lever length or a valve control arm starting angle is arranged to provide a selection of inherent flow characteristics selected from a group consisting of: a linear characteristic, a quick opening characteristic and an equal percentage characteristic.

In another preferred form, the axially slidable fluid control member may be a variable area diffuser or a cage-guided valve trim.

In another preferred form, the slidable fluid control member is devoid of a valve seat.

In another preferred form, the slidable fluid control member is devoid of a fluid seal.

In another preferred form, the rotary closure member may be a ball, a disk, a butterfly, or a plug.

DETAILED DESCRIPTION

The present disclosure generally relates to a rotary axial globe valve assembly, and, more particularly, to an integrated isolation-control valve assembly. For ease of reference, and to the extent possible, the same or similar components described in numerous embodiments will retain the same base reference numbers as outlined within the description, although the reference numbers will increase by integer multiples of 100. In subsequent embodiments, a description of many common elements may be abbreviated or even eliminated in the interest of brevity.

Figure 1:
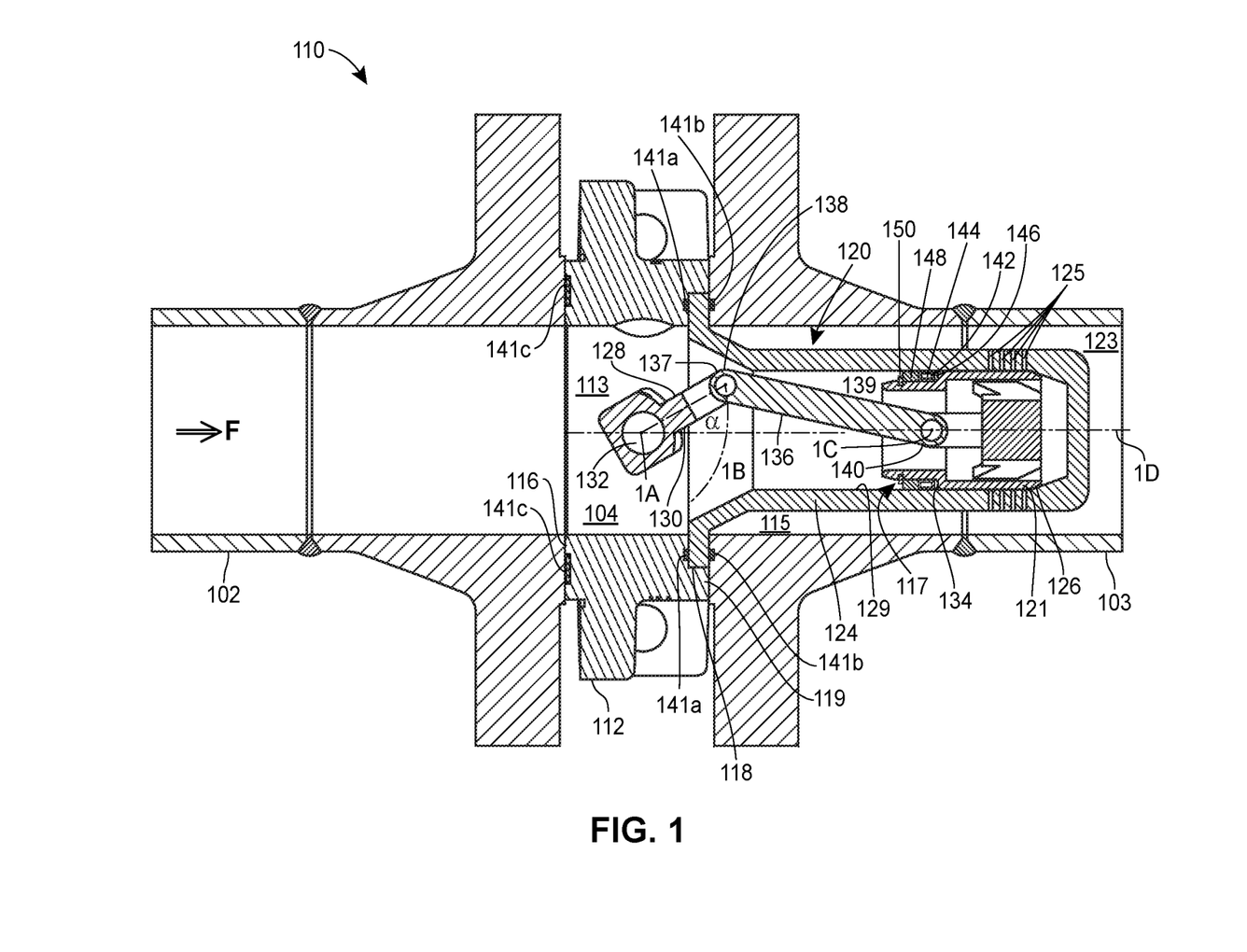
FIG. 1 is a cross-sectional view of a valve assembly showing an axial control element in a closed position in accordance with the teachings of the present disclosure.

Referring now to the drawings, FIG. 1 depicts a rotary axial globe valve assembled in accordance with the teachings of a first disclosed example of the present invention. The valve 110 includes a valve body 112 defining an inlet 113, an outlet 115, and a substantially cylindrical or axial fluid flow path 104 connecting the inlet 113 and the outlet 115 when the valve 110 is open, or at least partially open. The inlet 113 and outlet 115 shown in FIG. 1 assume a fluid flow from left to right through the valve 110. It is understood that the valve body can be either lug-style or wafer-style with fasteners (not shown) affixing the valve body between an upstream conduit 102 and a downstream conduit 103. A pivot shaft 132 is disposed in the valve body 112, and is rotatable about an axis 1A to control the opening and closing of the valve 110 by rotating a crank 128 connected to an axially slidable valve trim 120. The axially slidable valve trim 120 is operatively coupled to the crank 128 and disposed downstream of the fluid flow path 104 (to the right of the valve body in FIG. 1) in a downstream conduit 103 to control fluid flow through the valve body 112. The axially slidable valve trim 120 is slidable by the rotation of the crank 128 about the first axis 1A between an open position, in which the axially slidable valve trim 120 permits fluid flow between the inlet 113 and the outlet 115, and a closed position, in which the axially slidable valve trim 120 seals the inlet 113 from the outlet 115 of the valve body 112. More particularly, the axially slidable valve trim 120 abuts the outlet 115 of the valve body 112 on a downstream face surface 118 extending downstream of the valve body 112 into the downstream conduit 103 to control fluid flow through the valve body 112.

The sliding motion of the axially slidable valve trim 120 is accomplished by translating the rotary motion of the crank 128 to rectilinear motion of a valve plug 121 through a valve control arm 130 and valve lever 136 attached therebetween. The valve control arm 130 is attached to the first pivot shaft 132 that rotates about the first axis 1A. The valve lever 136 has a first end 138 attached to a second pivot shaft 137 of the valve control arm 130 and a second end 140 attached to a third pivot shaft 139 of the valve plug 121. To move the valve plug 121, an external actuator (not shown) may be coupled to the pivot shaft 132 to rotate the pivot shaft 132 through a range of motion such as sixty (60) degrees, but may be from forty-five (45) degrees to ninety (90) degrees, to adjust a seat load of the axially slidable valve trim 120 in relation to the actuator output torque. Rotation of the valve control arm 130 moves the center of the second pivot shaft 137 along arcuate path 1B rotating the first end 138 of the valve lever 136 about the second pivot shaft 137. As the first end 138 of the valve lever travels along the arcuate path 1B, the second end 140 of the valve lever 136 rotates about the third pivot shaft 139 about axis 1C. Axis 1A and 1C are substantially parallel and orthogonal to longitudinal axis 1D, thus, as the second pivot shaft 137 travels along accurate path 1B, the third pivot shaft 139 reciprocatingly travels along a longitudinal axis 1D.

Further, it should be appreciated that the seat load of the axially slidable valve trim 120 can be increased or decreased in relation to the starting angle of the crank, a (i.e. the angle formed by the valve control arm 130 with respect to the longitudinal axis 1D). That is depicted in FIG. 1B, the seat load is directly related to the torque, T, applied to the control arm 130 as represented by the equation:

$$F_{seat} \propto \frac{T}{\sin \alpha}$$

T Torque applied to valve control arm
α Angle of the valve control arm with respect to the longitudinal axis of the valve plug when the valve plug is fully opened
Fseat Seat load represented in the above equation, Fseat, the seat load of the valve plug 121, can be adapted by changing, α, the starting angle of valve control arm 130 with respect to the longitudinal 1D Axis when the valve plug 121 is fully opened.

The axially slidable valve trim 120 includes a valve plug 121 and a cage 124. The cage 124 is retained between the valve body 112 and the downstream conduit 103 abutting the downstream face surface 118 of the valve body 112. Gasket seals 141a, 141b and 141c are disposed between the valve body 112 and a downstream face surface 116 of the upstream conduit 102, the downstream face surface 118 of the valve body 112 and an upstream face surface 119 of the downstream conduit 103 and the cage 124, respectively, to complete a fluid seal of the valve body and the upstream and downstream conduit 102,103. Additionally, the seal assembly 117 is formed within the axially slidable valve trim 120 between the valve plug 121 and the cage 124 comprising a retaining ring 150, a backup ring 148 and a seal ring 146 to prevent fluid from leaking between the cage 124 and plug 121. As indicated in FIG. 1, the seal assembly 117 includes a spring-loaded seal ring 142 affixed to the valve plug 121. The spring-loaded seal 142 may have a spring 144, preferably formed of a metal material, disposed inside a jacket 146. The jacket 146 is preferably formed of a material that is flexible and does not generate excessive friction between the valve plug 121 and cage 124. A backup ring 148 and a retaining ring 150 are provided for maintaining the spring-loaded seal 142 in place on the valve plug 121.

The cage 124 is positioned in the fluid flow path 123 to influence desired characteristics of the fluid flow. The cage 124 has apertures 125 formed therein to allow fluid to flow through the cage from the inlet 113 to the outlet 115. The apertures 125 may be formed to alleviate detrimental fluid flow characteristics. For example, the apertures 125 may enhance pressure reduction or may reduce noise and cavitation generated as the fluid flows through the valve 110. According to the embodiment illustrated at FIG. 1, a seat 126 is positioned near a lower end of the cage 124. The cage 124 also defines an inner bore 129 disposed along an axis 1D.

More particularly, a plug 121 is provided inside the cage 124 for controlling fluid flow through the cage apertures 125. The valve plug 121 has an outer surface 134 sized to closely fit within the cage bore 129, so that the valve plug 121 is slidable within the cage 124. An actuator (not shown) drives the crank 128 through preferable ninety (90) degrees of rotation thereby moving the valve plug 121 between open and closed positions. In the closed position illustrated in FIG. 1, a lower end of the valve plug 121 engages the seat 126 thereby to prevent fluid from flowing through the apertures 125. In the open position, the valve plug 121 is pulled leftward (left in FIG. 1) so that at least portions of the apertures 125 are unobstructed, thereby allowing fluid to flow therethrough.

Figure 1A:
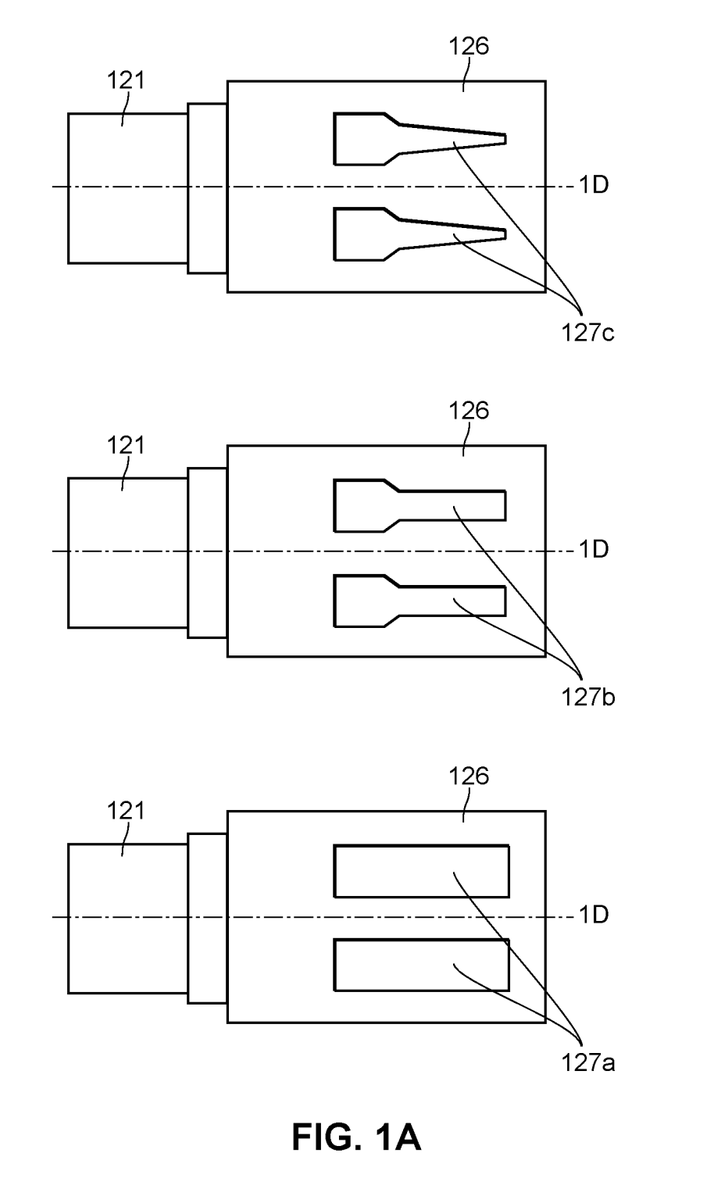
FIG. 1A is an enlarged elevational view of three (3) exemplary valve plugs having a quick opening (bottom), an equal percentage (middle), and linear flow (top) characteristic assembled in accordance with the teachings of the present disclosure.
Figure 1B:
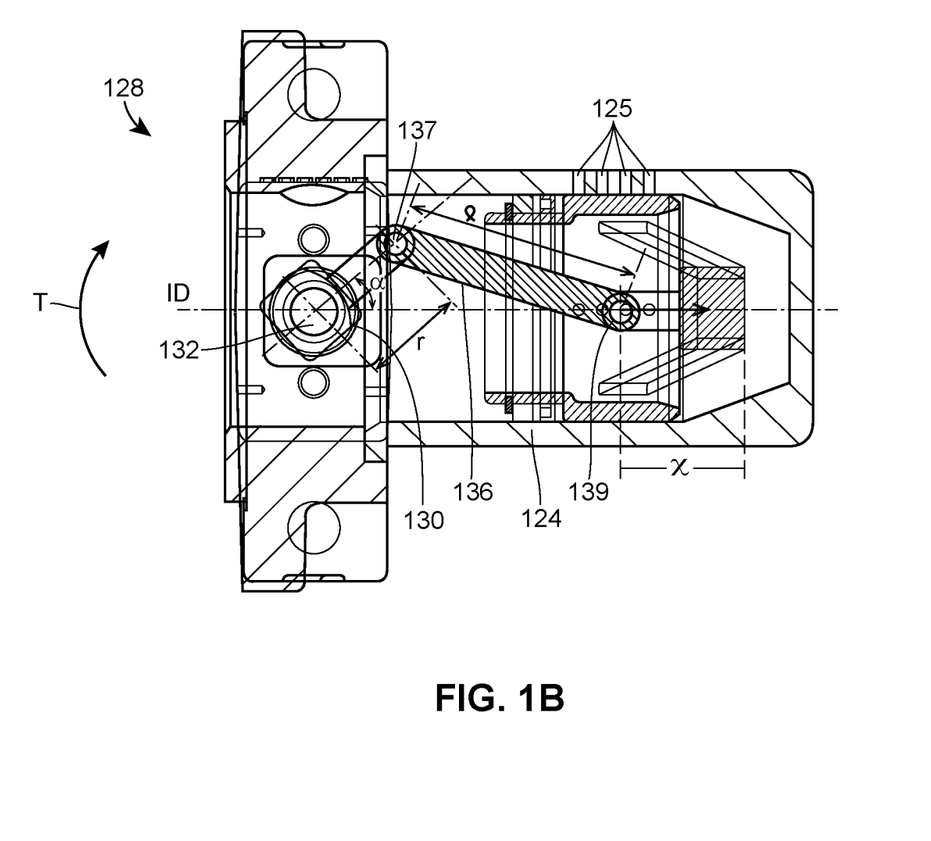
FIG. 1B is a cross-sectional view of another valve assembly showing an axial control element assembled in accordance with the teachings of the present disclosure.

In FIG. 1A, the axially slidable valve trim 120 may have various aperture shapes and/or configurations 127a, 127b, 127c to characterize (i.e. the inherent characteristic of the valve) fluid flowing through the inlet 113 when the axially slidable valve trim 120 is in the open position or partially open position such as quick opening, linear or equal percentage flow. Alternatively, the inherent characteristic can be modified by changing the dimensions of the crank 128 as well as changing the starting and ending angles of the crank 128. For example, FIG. 1B depicts a cage 124 having drilled hole passageways 125 that may provide flow characteristics of quick opening, linear and equal percentage through modification of the dimensions of the crank 128. That is, the flow characteristic is directly related to the travel of the valve plug 121 per degree of rotation as represented by the equation:

$$x = r \cos \alpha + \sqrt{l^2 - r^2 \sin^2 \alpha}$$

l length of the valve lever
r length of the valve control arm
α Angle of the valve control arm with respect to the valve plug in a fully opened position
x Travel of the valve plug
e presented in the above equation, x, the travel of the valve plug 121, and therefore the flow characteristic, can be adapted by either changing l, the length of the valve lever 136, r, the length of the valve control arm 130, or α, the starting angle of valve control arm 130 with respect to the longitudinal 1D Axis.

Figure 2:
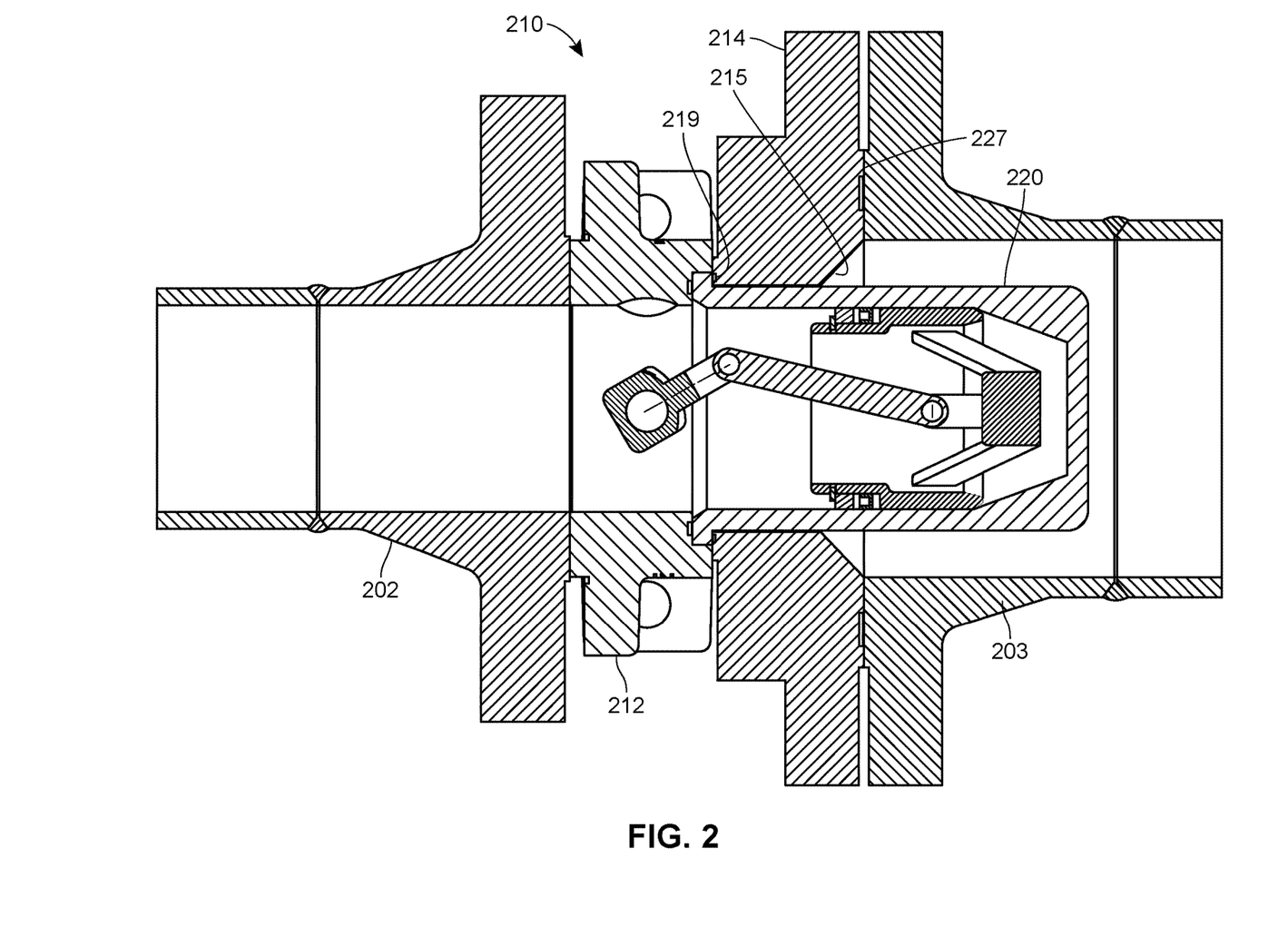
FIG. 2 is a cross-sectional view of a valve assembly having a spool piece and showing an axial control element in a closed position and assembled in accordance with the teachings of the present disclosure.

FIG. 2 illustrates another example of a rotary axial globe valve. The valve 210 includes a spool piece 214 to adapt the valve 210 to different port sizes and downstream pipe diameters. The spool piece 214 is disposed between a downstream face surface 219 of the cage 220 and an upstream face surface 227 of the downstream conduit 203. For example, the spool piece 214 can adapt the outlet 215 of the valve 210 from an outlet diameter of 2 inches to a downstream conduit diameter 203 of 6 inches. In certain applications, such as compressible flow applications, an outlet expansion is preferable when elevated pressure drops occur due to significant fluid expansion wherein the present example allows for economical pipe area selection without increasing the control valve size.

Figure 3A:
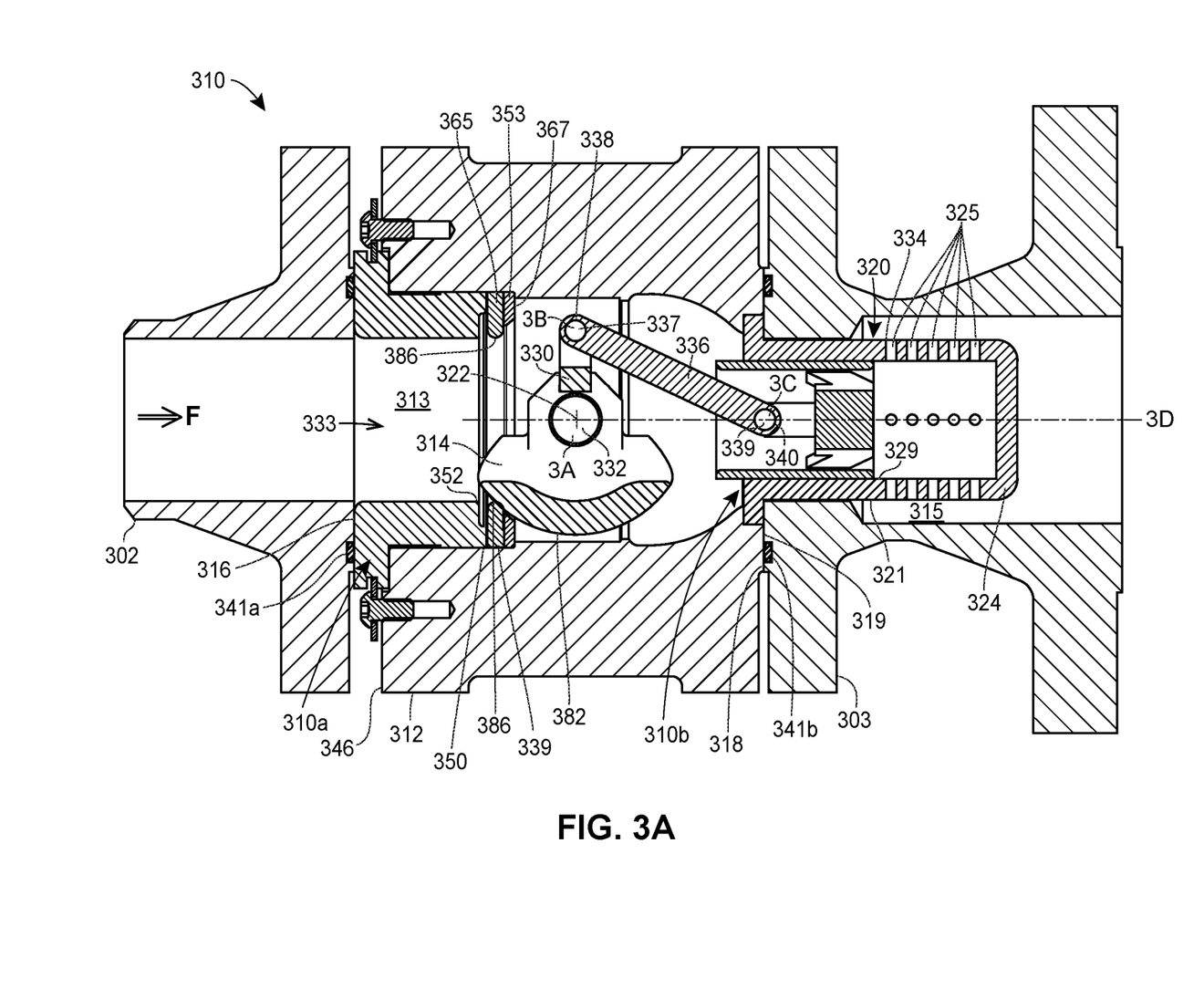
FIG. 3A is a cross-sectional view of a valve assembly having an isolation ball valve assembly and an axial control valve assembly assembled in accordance with the teachings of the present disclosure.
Figure 3B:
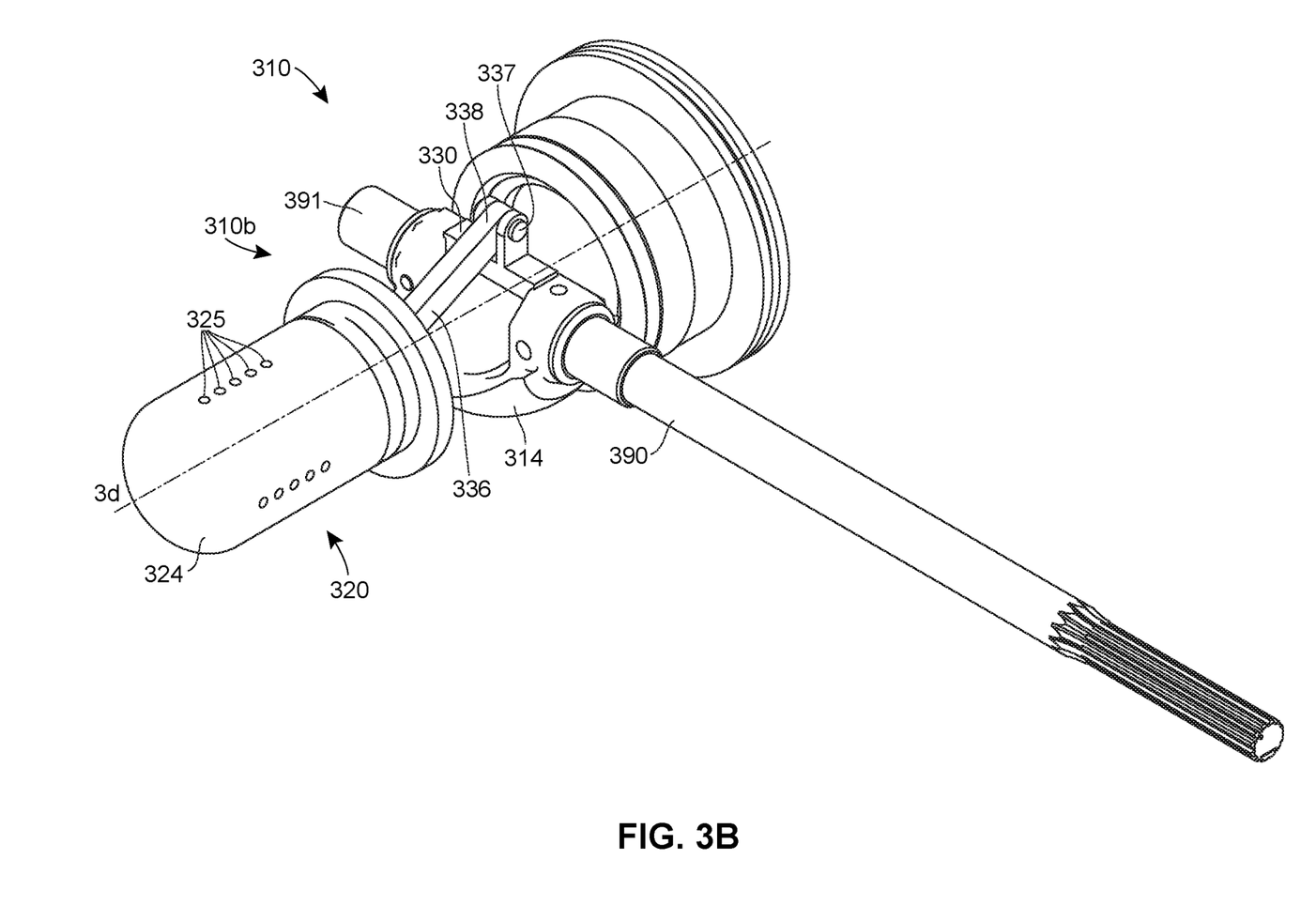
FIG. 3B is a perspective view of a valve trim assembly having an isolation ball valve assembly and an axial control valve assembly assembled in accordance with the teachings of the present disclosure.

FIGS. 3A and 3B depict another example of a rotary axial globe valve 310 comprising an isolation valve assembly 310*a* and a control valve assembly 310*b* in accordance with the teachings of the present invention. The isolation valve assembly 310*a* includes a valve body 312 and a ball 314 pivotably mounted within the valve body 312. The ball 314 mounts on, e.g., a shaft 332, about a pivot point 322, which the ball 314 can pivot or rotate. As previously described, fluid flows predominantly in the direction of arrow F. Therefore, the upstream side of the ball 314 is to the left of the ball 314, and the downstream side of the ball 314 is to the right of the ball 314.

The ball 314 serves as an impediment to fluid flow through the valve 310. The isolation valve assembly 310*a* includes the valve body 312 having a flow path 333 between an inlet 313, an outlet 315, and a seal assembly 350 affixed within the valve body 312. The valve body 312, having a generally cylindrical shape, defines the flow path 333 for a fluid traveling therethrough. At the right of the valve body 312, as oriented in FIG. 3A, is the outlet 315 of the flow path 333. The outlet 315 abuts the downstream conduit 303. In a middle portion of the valve body 312, a thru hole (not shown in cross section) penetrates the right wall of the valve body 312, and a blind hole (not shown in cross section) opens to the interior of the valve body 312. The thru holes and blind hole receive shafts 390 and 391, respectively (FIG. 3B). It is understood that disposed between the drive shaft 390 and the outer right wall or drive end of the valve body 312, a packing follower, a set of packing rings, and a bearing; however, such details have been removed for reasons of simplicity and brevity. A counterbore 339 creates the inlet 313 of the flow path 333 and, receives the seal assembly 350. Surrounding the inlet 313 is an inlet flange 346, which may be used to fasten or attach the valve 310 to the upstream conduit (fasteners not shown). The seal assembly 350, as shown best in FIG. 3A includes a ball seal 365 and a backup ring 367. As mentioned above, the seal assembly 350 is disposed within the counterbore 339 of the valve body 312. An interior surface 353 of the valve body 312 receives the ball seal 365 and the backup ring 36, respectively.

Abutting the ball seal 365 is the ball 314 (FIG. 3A). The ball 314 includes a spherical surface 382 that engages the ball seal 365 when the valve is in the closed position. Attached to the ball 314 are the follower shaft 391 and the drive shaft 390, respectively. To close the valve, the ball 314 is rotated to abut the ball seal 365, thereby creating a flow restriction of the flow path 333 at a contact point 386. As shown in FIG. 3A, when the ball 314 presses against the ball seal 365, the ball seal 365 may be displaced into the seal housing 352.

Additionally, the ball 314 translates its rotary motion to rectilinear motion of the control valve assembly 310*b* of a valve plug 321 via valve control arm 330 and a valve lever 336 attached therebetween. The valve control arm 330 of the ball 314 is attached to a first pivot shaft 332 that rotates about a first axis 3A. The valve lever 336 has a first end 338 attached to a second pivot shaft 337 of the valve control arm and a second end 340 attached to a third pivot shaft 339 of the valve plug 321. To move the valve plug 321, an external actuator (not shown) may be coupled to the pivot shaft 332 to rotate the pivot shaft 332 through a range of motion such as ninety (90) degrees. Rotation of the valve control arm 330 moves the center of the second pivot shaft 337 along arcuate path 3B rotating the first end 338 of the valve lever 336 about the second pivot shaft 337. As the first end 338 of the valve lever travels along the arcuate path 3B the second end 340 of the valve lever rotates about the third pivot shaft 339 about axis 3C. Axis 3A and 3C are substantially parallel and orthogonal to longitudinal axis 3D, thus, as the second pivot shaft 337 travels along accurate path 3B, the third pivot shaft 339 reciprocatingly travels along a longitudinal axis 3D.

The axially slidable valve trim 320 includes a cage 324 retained between the valve body 312 and the downstream conduit 303 abutting a downstream face surface 318 of the valve body 312. Gasket seals 341*a*, 341*b* are received between the valve body 312 and a downstream face surface 316 of the upstream conduit 302, the downstream face surface 318 of the valve body 312 and an upstream face surface 319 of the downstream conduit 303 and the cage 324, respectively, to complete a fluid seal of the valve body 312 and the upstream and downstream conduit 302,303. A plug 321 is provided inside the cage 324 for controlling fluid flow through the valve body 312. The valve plug 321 has an outer surface 334 sized to closely fit within the cage bore 329, so that the plug 321 is slidable within the cage 324. An actuator (not shown) drives the crank 330 through ninety (90) degrees of rotation thereby moving the plug 321 between open and closed positions. As depicted in FIG. 3A, in the open position, the valve plug 321 is pulled leftward in FIG. 3A so that at least portions of the apertures 325 are unobstructed, thereby allowing fluid to flow therethrough. In the closed position (not illustrated) the valve plug 321 is pushed rightward in FIG. 3A so at least a portion of the apertures 325 are obstructed to modify, characterize or limit fluid flowing therethrough. At valve closure as previously described, the ball 314 is rotated to abut the ball seal 365, thereby creating a flow restriction of the flow path 333 at a contact point 386 for tight shutoff. That is, in the present example valve, the valve plug 321 does not engage a valve seat within the cage 324 at shutoff. Further, the valve plug 321 does not include a valve plug seal assembly traditionally retained within a groove in the valve plug, which is generally used to minimize annular leakage flow between the valve plug and cage.

Figure 4:
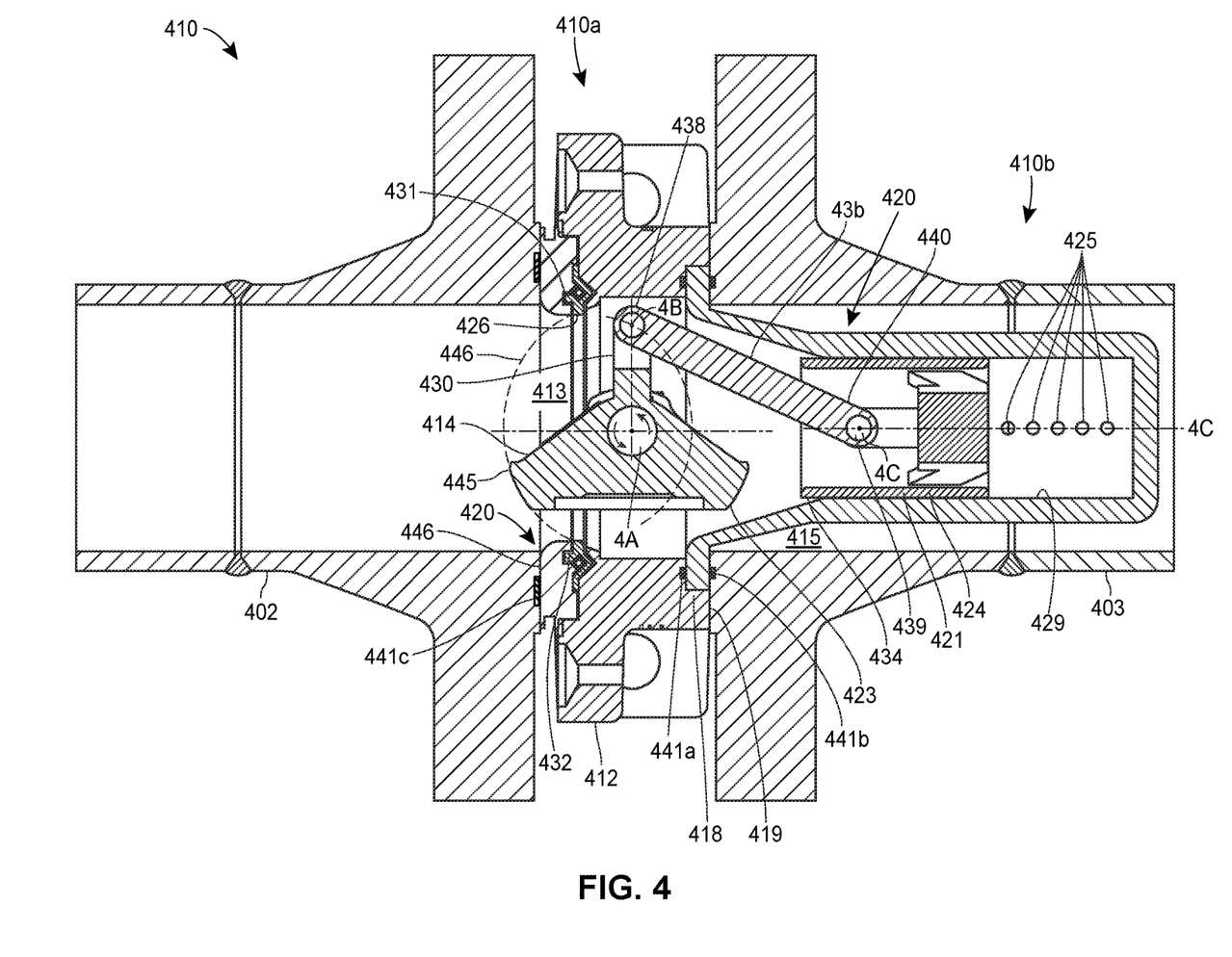
FIG. 4 is a cross-sectional view of a valve assembly having an isolation butterfly valve assembly and an axial control valve assembly assembled in accordance with the teachings of the present disclosure.

FIG. 4 illustrates another example of a rotary axial globe valve. FIG. 4 depicts an integrated rotary axial globe valve 410 comprising an isolation valve assembly 410*a* and a control valve assembly 410*b*. As previously described, fluid flows predominantly in the direction of arrow F. In operation, a disk 414 disposed within a valve body 412 of the isolation valve assembly 410*a* and rotates in the counter-clockwise direction (indicated as CCW) about axis 4A to open the isolation valve assembly 410*a* and may rotate in the opposite direction (indicated as CW) to close it. As the disk 414 rotates about a pivot point 442, an upper edge 445 and a lower edge 443 follow along a diametrical section 446 of the valve body 412. The lower edge 443 is also the leading edge of the disk 414 into the predominant fluid flow. The upper edge 445 is therefore the trailing edge in the fluid flow.

Additionally, the disk 414 translates its rotary motion to rectilinear motion of a valve plug 414 through a valve control arm 430 and valve lever 436 attached therebetween. The valve control arm 430 of the disk 414 is attached to a first pivot shaft 432 that rotates about a first axis 4A. The valve lever 436 has a first end 438 attached to a second pivot shaft 437 of the valve control arm and a second end 440 attached to a third pivot shaft 439 of the valve plug 414. To move the valve plug 414, an external actuator (not shown) may be coupled to the pivot shaft 432 to rotate the pivot shaft 432 through a range of motion such as ninety (90) degrees. Rotation of the valve control arm 430 moves the center of the second pivot shaft 437 along arcuate path 4B rotating the first end 438 of the valve lever 436 about the second pivot shaft 437. As the first end 438 of the valve lever travels along the arcuate path 4B the second end 440 of the valve lever rotates about the third pivot shaft 439 about axis 4C. Axis 4A and 4C are substantially parallel and orthogonal to longitudinal axis 4D, thus, as the second pivot shaft 437 travels along accurate path 4B, the third pivot shaft 439 reciprocatingly travels along a longitudinal axis 4D.

The axially slidable valve trim 420 includes a cage 424 retained between the valve body 412 and the downstream conduit 403 abutting a downstream face surface 418 of the valve body 412. Gasket seals 441a, 441b and 441c are disposed between the valve body 412 and a downstream face surface 416 of the upstream conduit 402, the downstream face surface 418 of the valve body 412 and an upstream face surface 419 of the downstream conduit 403 and the cage 424, respectively, to complete a fluid seal of the valve body 412 and the upstream and downstream conduit 402,403.

A plug 421 is provided inside the cage 424 for controlling fluid flow through the valve body 412. The valve plug 421 has an outer surface 434 sized to closely fit within the cage bore 429, so that the plug 421 is slidable within the cage 424. An actuator (not shown) drives the crank 430 through ninety (90) degrees of rotation thereby moving the plug 421 between open and closed positions. As depicted in FIG. 4, in the open position, the valve plug 421 is pulled leftward in FIG. 4 so that at least portions of the apertures 425 are unobstructed, thereby allowing fluid to flow therethrough. In the closed position (not illustrated) the valve plug 421 is pushed rightward in FIG. 3 so at least a portion of the apertures 425 are obstructed to modify, characterize or limit fluid flowing therethrough. At valve closure, the lower end 423 and upper end 425 of the disk 414 of the isolation valve assembly 410a engage the upper and lower seal regions 431, 432 thereby preventing fluid from flowing through the apertures 425. The valve plug 421 does not engage a valve seat within the cage 424 at shutoff.

The figures and description provided herein depict and describe preferred examples of a valve assembly having a flow conditioner and a flow conditioner for purposes of illustration only. One skilled in the art will readily recognize from the foregoing discussion that alternative variants of the components illustrated herein may be employed without departing from the principles described herein. Thus, upon reading this disclosure, those of skill in the art will appreciate still additional alternative structural and functional designs for flow conditioners. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

The invention claimed is:

1. A control valve comprising:
a valve body having a substantially axial fluid flow path therethrough and an upstream face surface and a downstream face surface;
an axially slidable valve trim disposed external to the valve body within a downstream conduit; and
a crank disposed within the valve body, the crank extending outside the valve body to operably couple to the axially slidable valve trim in the downstream conduit,
wherein the axially slidable valve trim comprises a cage and a plug, the cage abutting the downstream face surface, the cage including a sidewall defining a cage bore having a cage bore axis and the cage being arranged such that fluid flowing through the valve body exits through fluid passageways in the sidewall.

2. The control valve of claim 1, wherein the crank comprises a valve control arm disposed within the fluid flow path of the valve body, the valve control arm being rotatable about a pivot shaft, and a valve lever having a first end and a second end, wherein the first end is operatively coupled to the valve control arm and the second end is operatively coupled to the axially slidable valve trim.

3. The control valve of claim 1, wherein the cage includes a valve seat.

4. The control valve of claim 1, wherein the downstream conduit is selected from a spool piece or a downstream pipe.

5. The control valve of claim 4, wherein an outlet of the valve body defines a first bore and an outlet of the downstream conduit defines a second bore such that the downstream conduit adapts the first bore to the second bore.

6. The control valve of claim 5, wherein a first diameter of the first bore is less than a second diameter of the second bore.

7. The control valve of claim 1, wherein the cage includes plurality of apertures providing a selection of inherent flow characteristics from the group consisting of: a linear characteristic, a quick opening characteristic and an equal percentage characteristic.

8. The control valve of claim 2, wherein the at least one of a valve control arm length, a valve lever length or a valve control arm starting angle provides a selection of inherent flow characteristics from the group consisting of: a linear characteristic, a quick opening characteristic and an equal percentage characteristic.

9. A fluid valve control element comprising:
a rotary closure member defining a rotational axis and being operable between a first opened position and a second closed position;
an axially slidable fluid control member movable along a longitudinal axis and providing flow characterization of the fluid valve; and
a crank operably connected between the rotary closure member and the axially slidable fluid control member, wherein rotation of the rotary closure member about the rotational axis between the first open position and the second closed position motivates the axially slidable fluid control member to travel along the longitudinal axis, wherein the axially slidable fluid control member includes a plurality of apertures providing a selection of inherent flow characteristics from the group consisting of: a linear characteristic, a quick opening characteristic and an equal percentage characteristic.

10. The fluid valve control element of claim 9, wherein the crank comprises a valve control arm of the rotary closure member rotatable about a pivot shaft and a valve lever having a first end and a second end such that the first end of the valve lever is operatively coupled to the valve control arm and the second end of the valve lever is operatively coupled to the axially slidable fluid control member.

11. The fluid valve control element of claim 9, wherein the axially slidable fluid control member is selected from a variable area diffuser or a cage-guided valve trim.

12. The fluid valve control element of claim 11, wherein the variable area diffuser or a cage-guided valve trim is devoid of a valve seat.

13. The fluid valve control element of claim 11, wherein the variable area diffuser or a cage-guided valve trim is devoid of a fluid seal.

14. The fluid valve control element of claim 9, wherein the rotary closure member is selected from a ball, a disk, a butterfly or a plug.

15. A valve assembly comprising:
an isolation valve assembly, the isolation valve assembly consisting essentially of a valve body having a substantially axial fluid flow path extending therethrough and a rotary closure member disposed within the valve body, wherein the fluid flow path extends along a longitudinal axis; and
a control valve assembly, the control valve assembly consisting essentially of an axially slidable valve trim disposed within an adjacent downstream conduit external to the valve body and being operably connected to the isolation valve assembly, wherein the axially slidable valve trim comprises a cage and a valve plug slidably disposed within the cage along the longitudinal axis.

16. The valve assembly of claim 15, wherein the isolation rotary closure member includes a valve control arm.

17. The valve assembly of claim 16, wherein the isolation rotary closure member is selected from a ball, a disk, a butterfly or a plug.

18. The valve assembly of claim 16, wherein the cage abuts a downstream face surface of the valve body, and wherein the axially slidable valve trim further comprises a valve lever.

19. The valve assembly of claim 15, wherein the downstream conduit is selected from a spool piece or a downstream pipe.

20. The valve assembly of claim 19, wherein an outlet of the valve body defines a first bore and an outlet of the spool piece defines a second bore such that the spool piece adapts the first bore to the second bore and a first diameter of the first bore is less than a second diameter of the second bore.

21. The valve assembly of claim 15, wherein the axially slidable valve trim is selected from a variable area diffuser or a cage-guided valve trim.

22. The valve assembly of claim 18, wherein the at least one of a valve control arm length, a valve lever length or a valve control arm starting angle provides a selection of inherent flow characteristics of the valve assembly from the group consisting of:
a linear characteristic, a quick opening characteristic and an equal percentage characteristic.

23. The valve assembly of claim 18, wherein the cage includes a plurality of apertures providing a selection of inherent flow characteristics from the group consisting of: a linear characteristic, a quick opening characteristic and an equal percentage characteristic.

24. A valve comprising:
a valve body having a substantially cylindrical fluid flow path therethrough and including an upstream face surface, a downstream face surface, and an isolation rotary closure member disposed within the valve body being operable between a first opened position and a second closed position; and
an axially slidable valve trim disposed external to the valve body within a downstream conduit and being operably connected to the isolation rotary closure member to control fluid flow through the fluid flow path,
wherein an outlet of the valve body defines a first bore and an outlet of the downstream conduit defines a second bore such that the downstream conduit adapts the first bore to the second bore and a first diameter of the first bore is less than a second diameter of the second bore.

25. The valve of claim 24, wherein the axially slidable valve trim comprises a cage and a valve plug, the cage abutting the downstream face surface and including a sidewall defining a cage bore having a longitudinal axis.

26. The valve of claim 25, wherein the cage is devoid of a valve seat.

27. The valve of claim 25, wherein the valve plug is devoid of a valve plug seal assembly between the valve plug and the cage bore.

28. The valve of claim 24, wherein the operable connection between the axially slidable valve trim and the isolation rotary closure member includes a valve control arm and a valve lever.

29. The valve of claim 24, wherein the isolation rotary closure member is selected from a ball, a disk, a butterfly or a plug.

30. The valve of claim 24, wherein the downstream conduit is selected from a spool piece or a downstream pipe.

31. The valve of claim 29, wherein the at least one of a valve control arm length, a valve lever length or a valve control arm starting angle provides a selection of inherent flow characteristics of the valve assembly from the group consisting of: a linear characteristic, a quick opening characteristic and an equal percentage characteristic.

32. The valve of claim 25, wherein the cage includes a plurality of apertures providing a selection of inherent flow characteristics from the group consisting of: a linear characteristic, a quick opening characteristic and an equal percentage characteristic.

33. A valve comprising:
a valve body having a substantially cylindrical fluid flow path therethrough and including an upstream face surface, a downstream face surface, and an isolation rotary closure member disposed within the valve body being operable between a first opened position and a second closed position; and
an axially slidable valve trim disposed external to the valve body within a downstream conduit and being operably connected to the isolation rotary closure member to control fluid flow through the fluid flow path,
wherein the axially slidable valve trim comprises a cage and a valve plug, the cage abutting the downstream face surface and including a sidewall defining a cage bore having a longitudinal axis, and
wherein the cage includes a plurality of apertures providing a selection of inherent flow characteristics from the group consisting of: a linear characteristic, a quick opening characteristic and an equal percentage characteristic.

\* \* \* \* \*

UNITED STATES PATENT AND TRADEMARK OFFICE
CERTIFICATE OF CORRECTION

PATENT NO. : 10,962,122 B2
APPLICATION NO. : 16/028233
DATED : March 30, 2021
INVENTOR(S) : Michel K. Lovell Page 1 of 1

It is certified that error appears in the above-identified patent and that said Letters Patent is hereby corrected as shown below:

In the Specification

At Column 1, Line 36, "of the all" should be -- of all --.

At Column 1, Line 56, "and are for" should be -- for --.

At Column 9, Line 7, "valve plug 414" should be -- valve plug 421 --.

At Column 9, Line 13, "valve plug 414." should be -- valve plug 421. --.

At Column 9, Line 14, "valve plug 414," should be -- valve plug 421, --.

Signed and Sealed this
Second Day of November, 2021

Drew Hirshfeld
*Performing the Functions and Duties of the
Under Secretary of Commerce for Intellectual Property and
Director of the United States Patent and Trademark Office*